(12) United States Patent
Goldschmidt et al.

(10) Patent No.: US 7,254,938 B2
(45) Date of Patent: Aug. 14, 2007

(54) POWER SUPPLY AND TRANSFORMER

(75) Inventors: Stephen P. Goldschmidt, Westport, IN (US); Wilbur H. Crawley, Columbus, IN (US)

(73) Assignee: Arvin Technologies, Inc., Troy, MI (US)

( * ) Notice: Subject to any disclaimer, the term of this patent is extended or adjusted under 35 U.S.C. 154(b) by 108 days.

(21) Appl. No.: 10/737,333

(22) Filed: Dec. 16, 2003

(65) Prior Publication Data
US 2005/0126160 A1 Jun. 16, 2005

(51) Int. Cl.
*F01N 3/00* (2006.01)

(52) U.S. Cl. ............................. 60/275; 60/274; 60/285; 204/228.1; 204/229.4; 204/229.8; 204/230.2

(58) Field of Classification Search ................. 60/274, 60/275, 285; 204/196.26, 196.27, 228.1, 204/229.4, 229.8, 230.2
See application file for complete search history.

(56) References Cited

U.S. PATENT DOCUMENTS

| | | | | |
|---|---|---|---|---|
| 4,387,529 A | * | 6/1983 | Hedstrom | ..................... 43/112 |
| 4,734,828 A | * | 3/1988 | Vargo | ........................ 363/22 |
| 4,855,891 A | * | 8/1989 | Paul | ........................ 363/56.08 |
| 5,264,803 A | * | 11/1993 | Mayfield | ................ 330/124 R |
| 5,409,784 A | | 4/1995 | Bromberg et al. | |
| 5,425,332 A | | 6/1995 | Rabinovich et al. | |
| 5,437,250 A | | 8/1995 | Rabinovich et al. | |
| 5,822,981 A | * | 10/1998 | Williamson et al. | .......... 60/275 |
| 5,845,488 A | * | 12/1998 | Hancock et al. | .............. 60/275 |
| 5,887,554 A | | 3/1999 | Cohn et al. | |
| 6,081,438 A | * | 6/2000 | Saint-Pierre et al. | .......... 363/95 |
| 6,205,036 B1 | * | 3/2001 | Anzawa | ....................... 363/20 |
| 6,321,531 B1 | * | 11/2001 | Caren et al. | .................. 60/275 |
| 6,639,813 B2 | * | 10/2003 | Yamagishi et al. | ...... 363/21.12 |
| 2003/0140622 A1 | | 7/2003 | Taylor, III et al. | |
| 2003/0143442 A1 | | 7/2003 | Daniel et al. | |
| 2003/0143445 A1 | | 7/2003 | Daniel et al. | |

OTHER PUBLICATIONS

Bill Andreycak, "New Driver ICs Optimize High Speed Power MOSFET Switching Characteristics," pp. 3-151 to 3-165, Sep. 1999.
Phillips Semiconductors Product Specification for Insulated Gate Bipolar Transistor (IGBT) BUK854-800A, pp. 1 to 7, Oct. 1994.
International Search Report and Written Opinion of the International Searching Authority (8 pages)(Oct. 3, 2005).
Simon, Winding the Universal Coil, Electronics, Oct. 1936, 22-24, 67, vol. 9-No. 10, McGaw-Hill Pub. Co., Albany, NY.
Hershey, The Design of the Universal Winding Proceedings of the IRE, 442-446, vol. 29, 1941, The Institute of Radio Engineers, Inc., New York, NY.
Watkinson, Universal Coil Winding, Proceedings of the IRE Australia, Jul. 1950, 179-186, vol. 11-No. 7, Australia.

* cited by examiner

*Primary Examiner*—Binh Q. Tran
(74) *Attorney, Agent, or Firm*—Barnes & Thornburg LLP

(57) ABSTRACT

A circuit for providing a potential difference across a gap between two electrodes of a fuel reformer, oxides of nitrogen trap or soot filter regenerator for an internal combustion engine or the like. The circuit includes a power source, a transformer including a primary winding and a secondary winding for coupling across the electrodes. The power source is coupled to the primary winding. A switch or switches is/are coupled to the primary winding.

47 Claims, 6 Drawing Sheets

POWER SUPPLY AND TRANSFORMER

FIELD OF THE INVENTION

This invention relates to power supplies. It is disclosed in the context of a power supply for delivering variable amounts of power to an electrode gap. However, it is believed to be useful in other applications as well.

BACKGROUND OF THE INVENTION

Various types of devices employ electrode gaps to achieve various objectives. There are, for example, the devices illustrated and described in U.S. patents and published patent applications: U.S. Pat. Nos. 5,887,554; 5,437,250; 5,425,332; 5,409,784; U.S.-2003-0143445-A1; U.S.-2003-0143442-A1; and, U.S.-2003-0140622-A1. The disclosures of these references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF THE INVENTION

According to an aspect of the invention, a circuit for providing a potential difference across a gap between two electrodes of a utilization device includes a power source and a transformer including a primary winding and a secondary winding for coupling across the electrodes. The power source is coupled to the primary winding. A first switch is coupled to one of the two terminals of the primary winding and a second switch coupled to the other of the two terminals of the primary winding.

According to another aspect of the invention, a circuit provides a potential difference across a gap between two electrodes of a utilization device. The circuit includes a power source. The circuit further includes a transformer comprising a core, a primary winding for inducing flux in the core, and a secondary winding oriented with respect to the core so that flux in the core induces voltage in the secondary winding. The secondary winding is wound in sections and coupled to the electrodes. The power source is coupled to the primary winding. At least one switch is coupled to the primary winding to induce current flow in the primary winding.

Illustratively according to this aspect of the invention, the primary winding is wound around the core.

Further illustratively according to this aspect of the invention, the apparatus comprises a dielectric interposed between the core and the primary winding.

Illustratively according to this aspect of the invention, the secondary winding is wound around the primary winding.

Further illustratively according to this aspect of the invention, the apparatus comprises a dielectric interposed between the primary winding and the secondary winding.

Illustratively according to the invention, at least one of a fuel reformer having two electrodes, an oxides of nitrogen trap having two electrodes, and a soot filter regenerator having two electrodes, is coupled to an internal combustion engine. The circuit provides the potential difference across the gap between the two electrodes.

Additionally illustratively according to the invention, the or each switch further includes a second terminal coupled to the source.

Further illustratively according to the invention, the apparatus includes a source of operating frequency signals. The switches are coupled to the source of operating frequency signals.

Illustratively according to the invention, the source of operating frequency signals comprises a source of signals at a frequency which is between about 0.1 times a resonant frequency of a circuit including the secondary winding and about 10 times said resonant frequency.

Additionally illustratively according to the invention, the circuit including the secondary winding further includes the electrodes coupled across the secondary winding.

Illustratively according to the invention, the switches comprise solid state switches.

Further illustratively according to the invention, the or each switch includes a control terminal coupled to the source of operating frequency signals.

Additionally illustratively according to the invention, the switches comprise insulated gate bipolar transistors (IGBTs).

Alternatively illustratively according to the invention, the switches comprise field effect transistors (FETs).

Illustratively according to the invention, the source of operating signals comprises a source of signals having a fundamental frequency between about 500 Hz and about 250 KHz.

Further illustratively according to the invention, the source of operating frequency signals comprises a source of operating frequency signals having a fundamental frequency between about 500 Hz and about 250 KHz modulated by a modulating signal having a frequency between about 50 Hz and 50 KHz.

Additionally illustratively according to the invention, the modulating signal has a variable pulsewidth defining a duty cycle.

Illustratively according to the invention, the duty cycle is between about 20% and about 100%.

Further illustratively according to the invention, the apparatus includes a sensor coupled to the source of operating frequency signals and adapted to sense a parameter of the utilization device.

Illustratively according to the invention, the sensor comprises a device for providing a temperature-related output signal.

Alternatively or additionally illustratively according to the invention, the sensor comprises a device for providing a pressure-related output signal.

Alternatively or additionally illustratively according to the invention, the sensor comprises a timer which times elapsed time since the occurrence of an event.

Alternatively or additionally illustratively according to the invention, the sensor comprises a device for sensing the time duration of each of multiple states of a system capable of assuming multiple states, for assigning respective weights to the sensed time durations, for accumulating the weighted, sensed time durations, and for providing an output when the accumulated, weighted, sensed time durations reach a threshold.

Illustratively according to the invention, the device for sensing the time duration of each of multiple states of a system capable of assuming multiple states comprises a device for sensing the time duration of operation of an engine in each of multiple ranges of at least one of engine load and engine torque.

Illustratively according to the invention, the sensor comprises a device for sensing the time duration of operation of an engine in each of multiple ranges of both engine load and engine torque.

Alternatively or additionally illustratively according to the invention, the sensor comprises a device for providing an output signal related to a concentration of a component of a fluid stream.

Illustratively according to the invention, the sensor comprises a device for providing an output signal related to a concentration of a gas or mixture of gases in a gas stream.

Illustratively according to the invention, the sensor comprises a device for providing an output signal related to the concentration of at least one of oxides of nitrogen, nitrogen and oxygen in a gas stream.

BRIEF DESCRIPTION OF THE DRAWINGS

The invention may best be understood by referring to the following detailed descriptions and accompanying drawings which illustrate the invention. In the drawings:

FIGS. 1, 1a and 1b illustrate somewhat simplified partly block and partly schematic diagrams of circuits useful in understanding the invention;

DETAILED DESCRIPTION OF ILLUSTRATIVE EMBODIMENTS

In the following description, certain integrated circuits and other components are identified, with particular circuit types and sources. In many cases, terminal names and pin numbers for these specifically identified circuit types and sources are noted. This should not be interpreted to mean that the identified circuits are the only circuits available from the same, or any other, sources that will perform the described functions. Other circuits are typically available from the same, and other, sources which will perform the described functions. The terminal names and pin numbers of such other circuits may or may not be the same as those indicated for the specific circuits identified in this application.

Figure 1:
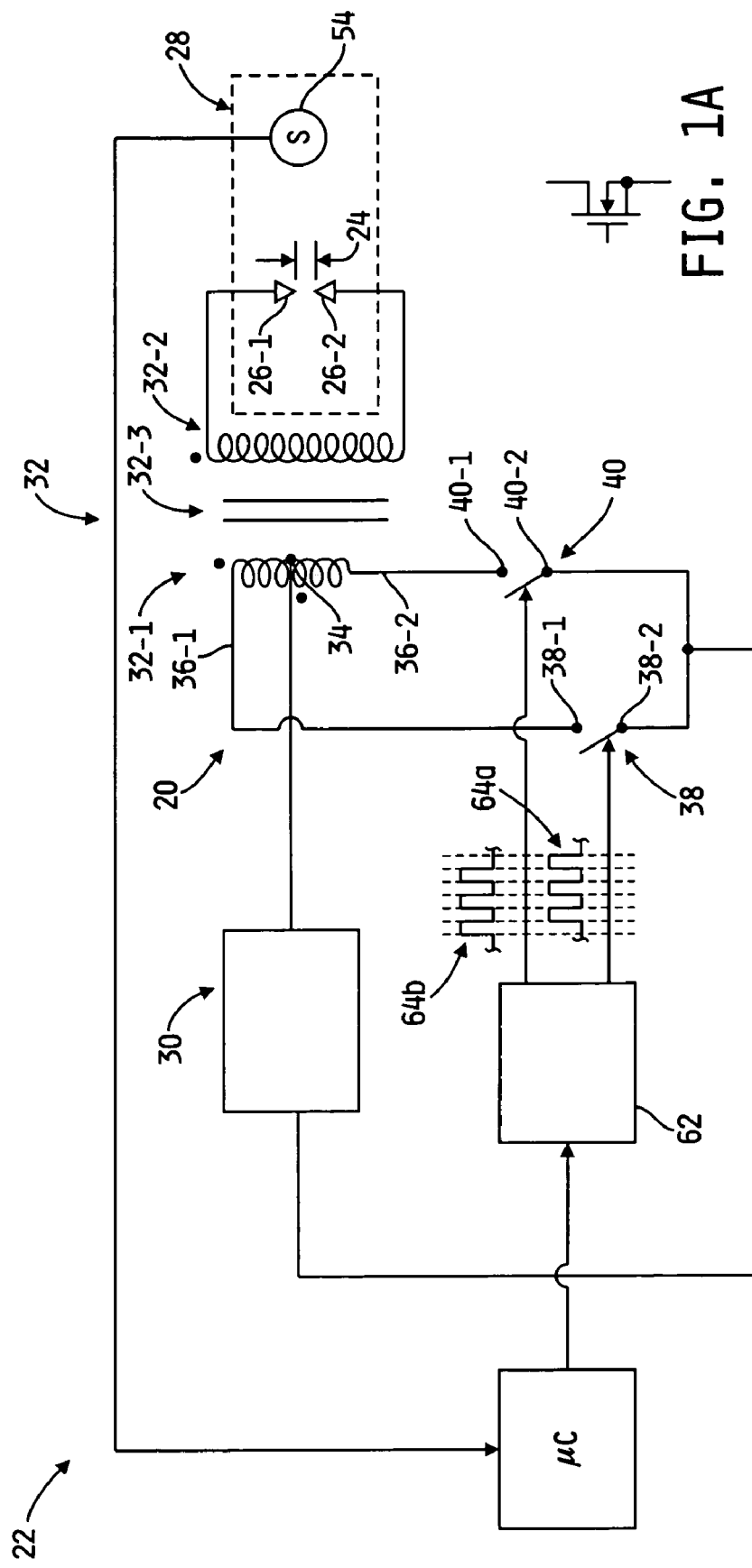

Referring now particularly to FIG. 1, a circuit 20 constructed according to the invention is used in a control system 22 to provide a variable power electrical discharge across a gap 24 between a pair of electrodes 26-1, 26-2. The illustrative electrode pair 26-1, 26-2 may be electrodes of a utilization device 28 such as, for example, a fuel reformer, a soot filter regenerator, an oxides of nitrogen (herein sometimes NOx) trap, or the like. The circuit 20, when embodied in one of these applications, typically will be designed to operate from a DC power source 30, such as a 12 VDC or 24 VDC power supply of an automotive vehicle such as, for example, a diesel-powered truck tractor. Circuit 20 includes a high-voltage transformer 32 including a primary winding 32-1 and a secondary winding 32-2. A center tap 34 of primary winding 32-1 is coupled to one terminal of source 30. One of the end terminals 36-1 of the primary winding 32-1 is coupled to a first terminal 38-1 of a switch 38. The other end terminal 36-2 of the primary winding 32-1 is coupled to a first terminal 40-1 of a switch 40. The remaining terminals 38-2, 40-2 of switches 38, 40, respectively, are coupled to the other terminal, illustratively the reference (herein sometimes ground or reference) terminal of source 30. The switches 38, 40 are operated at a frequency, illustratively on or about the resonant frequency of the transformer 32 and its load, including the electrodes 26 and contents of the gap 24. The switches illustratively are solid state switches capable of switching the power required to be delivered to the gap 24 in a circuit 20 of this type. Illustrative switches of this type include power FETs (FIG. 1a) and IGBTs (FIG. 1b). A suitable example is the International Rectifier type IRFPS3810 power MOSFET. The pulses 50 for operating the switches are provided by a driver 62 to control terminals of the switches 38, 40.

Electrical discharges are, of course, inherently unstable. A familiar example of this instability is lightning. A typical single stroke of lightning lasts only a small fraction of a second, although considerable potential energy remains across a cloud-to-ground gap. The conductive pathway of atmospheric constituents forms, the stroke occurs, and the conductive pathway dissipates quite quickly. Thus, the impedance across the cloud-to-ground gap swings between a relatively quite low impedance through the atmospheric constituents during a lightening stroke and a relatively quite high impedance before and after the stroke. The same is true, on a much smaller scale, of course, for any other electric arc discharge. The impedance seen by the electrodes 26 across which the discharge forms and dissipates swings between relatively very low and relatively very high.

The makeup of the constituents of the gap 24 also affect the impedance. For example, if the constituents of the gap 24 vary in concentration and/or dielectric strength, then the impedance of the gap 24 will vary correspondingly. As a result of these variations, it may be necessary or desirable to change the power delivered by the supply 20 to the gap 24, for example, under some type of closed loop control.

For example, let it be assumed that the utilization device 28 is a fuel reformer 28. During initialization of a reforming process, the oxygen and hydrocarbon ratios can change rapidly. This rapid change may occur, for example, because heavy truck and light vehicle (for example, automobile) engines operate under dynamic conditions of acceleration and load.

As another example, let it be assumed that the utilization device 28 is a soot filter regeneration system (herein sometimes a soot burner). If the engine whose soot filter is to be regenerated is cold, owing to not having been operating for very long, more power may have to be delivered to the gap 24 to heat the engine exhaust stream sufficiently to convert soot on the filter to $CO_2$. On the other hand, if the engine has been operating for some time when the soot burner is called upon to regenerate its soot filter, the interior of the soot filter and adjacent components may be hot enough that relatively little energy needs to be added to this system by the electrodes 26 to begin to convert the soot on the filter to $CO_2$. In that case relatively less power will have to be provided by circuit 20 to gap 24. And, the soot (carbon)-to-$CO_2$ process is exothermic, so that once started, it may be self-sustaining, in which case the amount of power supplied to the gap 24 may be reduced even further.

The control loop is closed or control otherwise established in the embodiment illustrated in FIG. 1 by, for example, some type of sensor 54. The type of sensor 54 will depend upon the application to which the circuit is to be put, and upon the nature of the control and drive circuitry μC, 62 associated with circuit 20. For example, in a soot filter regenerator, the sensor 54 might be a thermistor, a thermocouple or other device for providing a temperature-related output signal, a pressure transducer which signals when the pressure across the soot filter has increased to a threshold at which regeneration is to commence, or the like. The sensor 54 might also be as simple as a timer which times engine operating time since the last regeneration, or as complex as a system which stores the time duration of engine operation in each of several different engine operating ranges of, for example, load and torque, and employs an algorithm to determine when the accumulated engine operation, appropriately weighted for each of these various ranges, reaches a threshold at which regeneration is to commence. In a NOx trap or fuel reformer, the sensor might be a sensor for sensing the concentration of NOx, $N_2$, $O_2$, or some other constituent of the effluent gas, the concentration of which correlates with the performance of the trap. Again, the control might also be a timer which keeps account of engine operating time since the last regeneration, or as complex as a system which stores the time duration of engine operation in each of several different engine operating ranges of, for example, load and torque, and employs an algorithm to determine when the accumulated engine operation, appropriately weighted for each of these various ranges, reaches a threshold at which regeneration is to commence. Other control strategies and inputs are of course available instead of, or in parallel with, the specifically disclosed ones.

Figure 2:
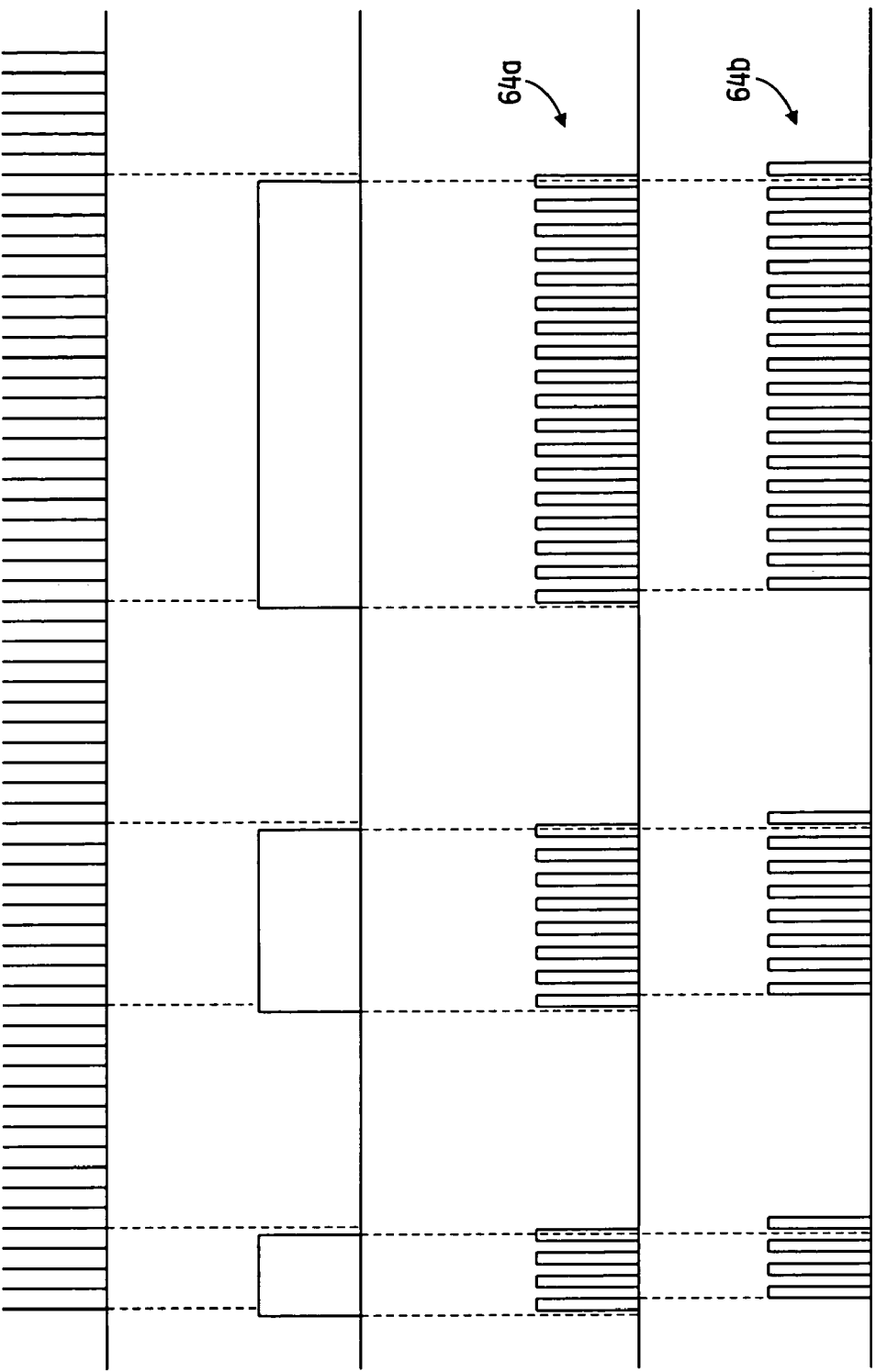
FIGS. 2a-d illustrate waveforms useful in understanding the invention.

The switches 38, 40 in the illustrative embodiment are driven from a source of pulses 50 of the general format illustrated in FIG. 2a. The pulses 50 have a pulse frequency $f_{pulse}$ in the 500 Hz to 250 KHz range, illustratively 55 KHz, and a pulsewidth of, for example, 100 nanoseconds (nsec). Their frequency is modulated by a pulse repetition frequency $f_{rep}$ in the 50 Hz to 50 KHz range and with a pulsewidth $t_D$, thus defining a duty cycle D such that $D = t_D \times f_{rep}$. See FIG. 2b. The resulting pulse train is used to generate two oppositely phased drive signals 64a and 64b generally as illustrated in FIGS. 2c and 2d. Thus, if the power required to be delivered to the gap 24 is relatively lower, and D=20%, the 55 KHz pulses 64a, 64b are provided to the control terminals of switches 38, 40, respectively, collectively 20% of the time. If the power required to be delivered to the gap 24 is at a maximum, D=100%, and the 55 KHz pulses 6a, 64b are provided to the control terminals of switches 38, 40, continuously, that is, collectively 100% of the time. While in the illustrated embodiment, a driver circuit 62 is used basically to halve the frequency of the signal of FIG. 2a in the intervals determined by the signal of FIG. 2b, and then generate from this halved frequency signal the two oppositely phased pulse trains 64a, 64b illustrated in FIGS. 2c and 2d, it is contemplated that the pulse trains illustrated in FIGS. 2c and 2d can be provided by the microcomputer or microcontroller (herein collectively sometimes μC) which controls the operation of the utilization device 28. Of course, it may, and quite likely will, be necessary to amplify any pulse trains output from the μC, rather than simply coupling them to the control terminals of the switches 38, 40, because the drive currents available at output terminals of such μCs typically are not great enough to drive such switches 38, 40.

Figure 3:
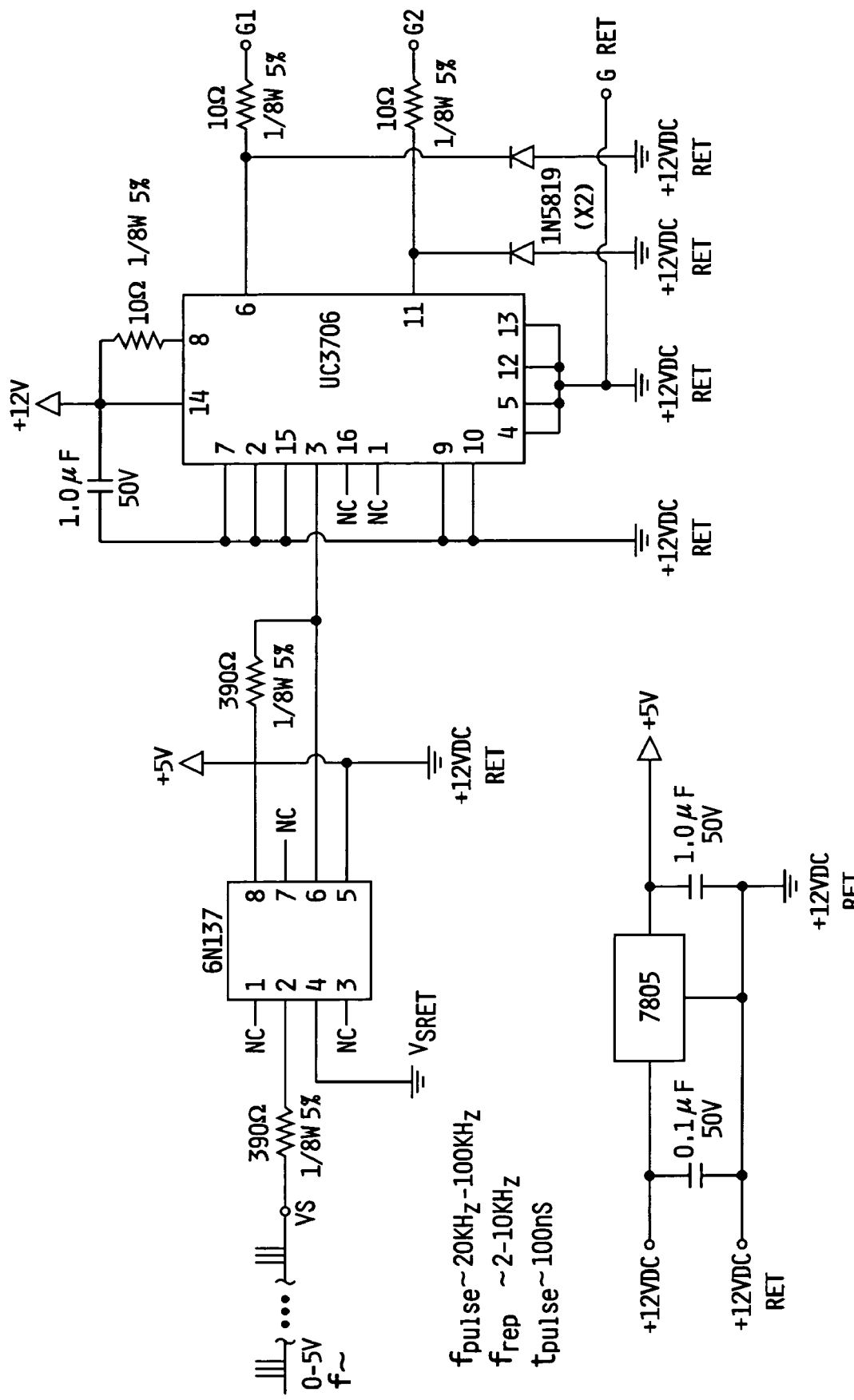
FIG. 3 illustrates a partly block and partly schematic diagram of a circuit useful in understanding the invention.

Turning now to an implementation of the drive circuitry for switches 38, 40, and referring particularly to FIG. 3, the pulse train of FIG. 2a modulated by the signal of FIG. 2b is coupled to an input port, illustratively pins 2 and 3, of appropriate buffer/isolation circuitry 60, in this case an optical coupler. Optical coupler 60 illustratively is a Texas Instruments type 6N137 optical coupler. An output port, illustratively pins 5 and 6, of isolation circuit 60 is coupled to an input port, illustratively pins 2 and 3, of driver circuit 62. Driver circuit 62 illustratively is a Unitrode UC3706 driver IC, as described in Andreycak, Bill, "New Driver ICs Optimize High Speed Power MOSFET Switching Characteristics," Unitrode Application Notes U-118, pp. 3-151-3-165, the disclosure of which is hereby incorporated herein by reference. As noted in that reference, this particular driver circuit 62 provides the two oppositely phased outputs of FIGS. 2c and 2d on its pins 6 and 11, both with respect to ground. These oppositely phased outputs are coupled to the control terminals of respective ones of switches 38 and 40, thus providing current alternately through switch 38 and its half of primary winding 32-1, and through switch 40 and its half of primary winding 32-1.

It is contemplated that the drive circuitry for the two switches 38, 40 can adjust any one or more of duty cycle, operating frequency, and arc repetition frequency to deliver a range of power to the variable impedance of gap 24. This permits fulfillment of the energy requirements to insure proper operation of the utilization device 28. The control and drive circuitry μC, 62 may employ any of a number of control strategies including time and/or frequency domain control schemes to vary duty cycle D, operating frequency, and arc repetition frequency. The control algorithms operate to cause the circuit 20 to deliver required power to a gap 24 whose electrical impedance varies over a wide range. It is believed that the wide variation of gap 24 impedance would make it difficult for prior art impedance matching systems to deliver the required power to the gap 24. Additionally, the circuit 20 delivers a bipolar electric discharge across gap 24. It is believed that the bipolar nature of the discharge reduces electrode 26 erosion, resulting in greater reliability. Flux in the core 32-3 of transformer 32 is generated first in one direction and then in the other by the center tap 34 configuration of primary winding 32-1. That is, driving current flows first to ground in one direction as a first switch, 38, for example, closes and then in a second direction as the first switch 38 opens and the second switch 40 closes. This reduces the likelihood of residual flux buildup in the core 32-3 which might otherwise adversely affect the performance of circuit 20.

Figure 4:
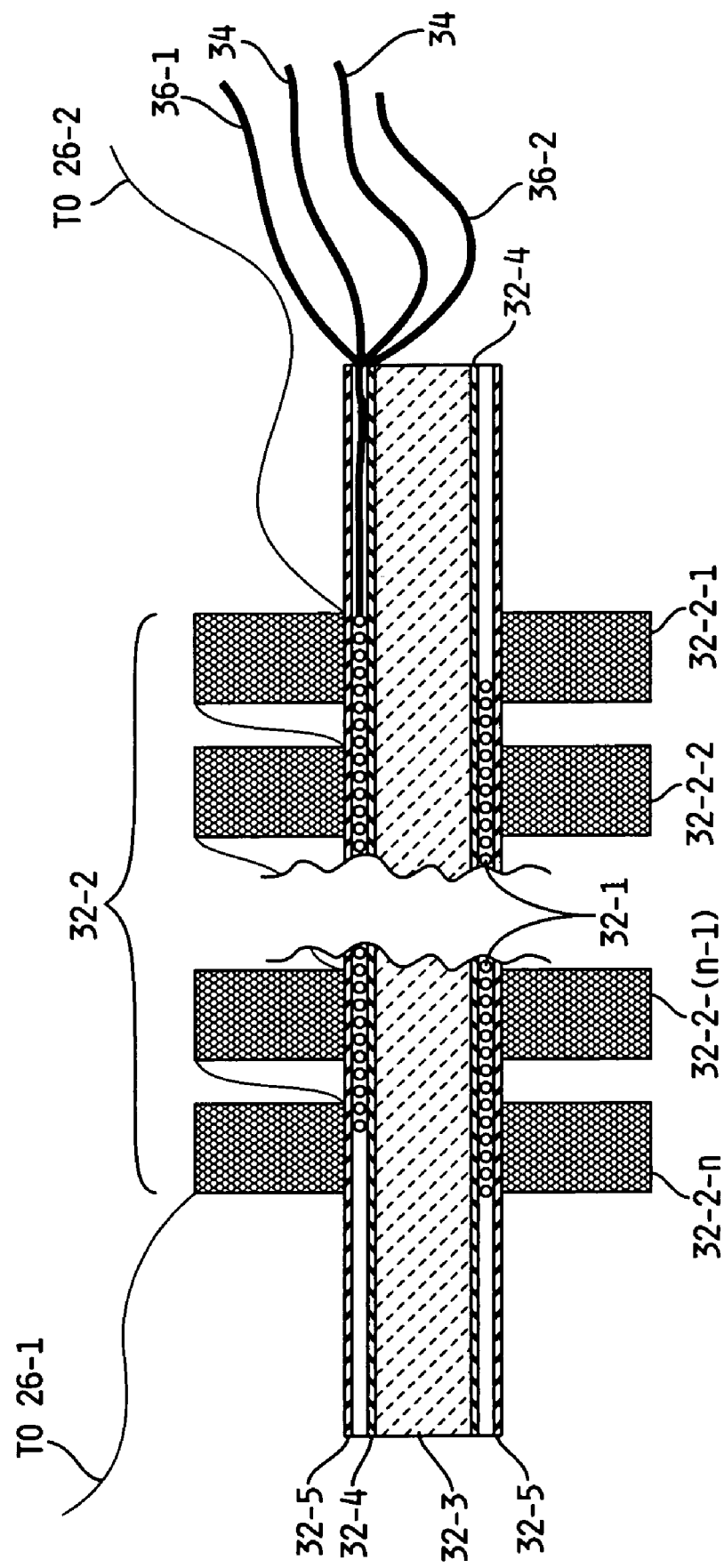
FIG. 4 illustrates a longitudinal sectional view of a detail of the circuit illustrated in FIG. 1.
Figure 5:
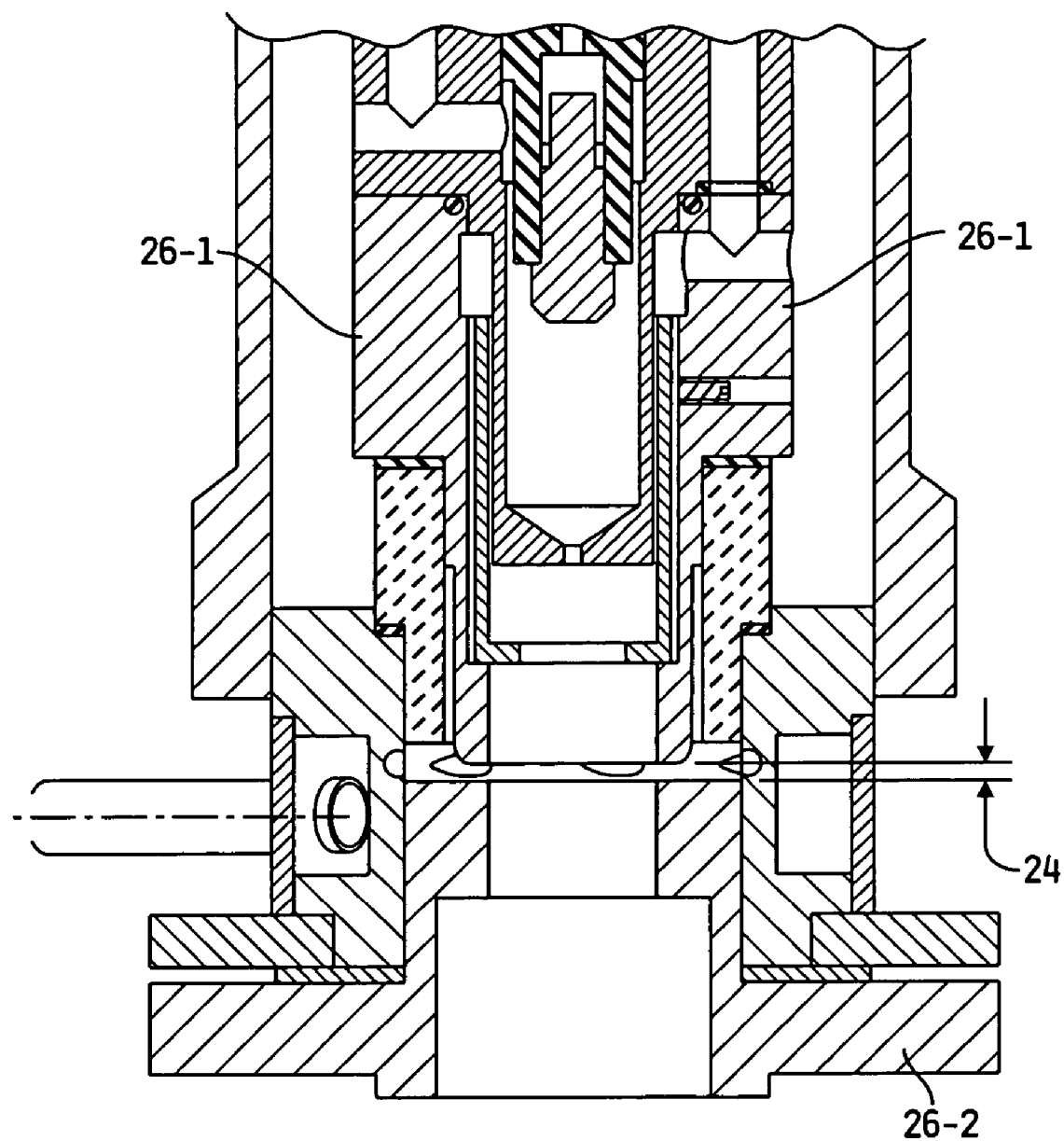
FIG. 5 illustrates a longitudinal sectional view of a detail of an embodiment of the circuit illustrated in FIG. 1; and, FIG. 6 illustrates a longitudinal sectional view of a detail of another embodiment of the circuit illustrated in FIG. 1.
Figure 6:
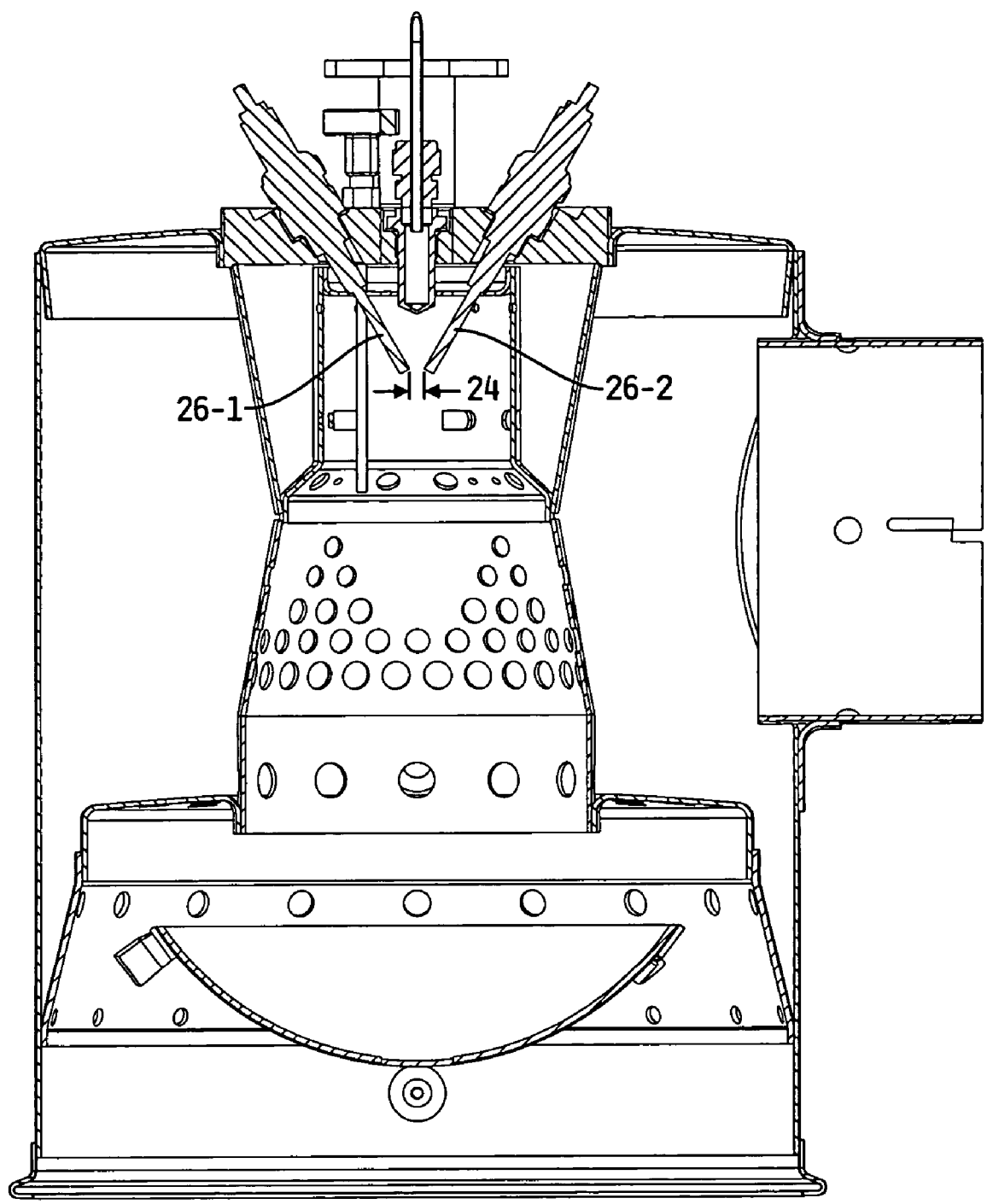

An illustrative configuration of the transformer 32 is illustrated in FIG. 4. The primary 32-1 of transformer 32 is wound on a ferrite rod core 32-3. A dielectric inner bobbin 32-4 is placed over the ferrite rod 32-3, and the primary 32-1 is wound on the inner bobbin 32-4. Illustratively, the primary 32-1 is wound from 24 turns of 14 AWG wire coated with an insulator. Two leads are brought out from center tap 34 to facilitate coupling to, for example, an automobile battery 30. A dielectric outer bobbin 32-5 is placed over the primary 32-1 and the secondary 32-2 is wound on the outer bobbin 32-5. The secondary 32-2 is wound using a universal winding technique, with multiple sections 32-2-1, 32-2-2, ... 32-2-(n-1), 32-2-n. The number, n, of sections in part determines the maximum potential which can be achieved across terminals 36-1, 36-2. An illustrative transformer 32 with n=7 provided a potential across terminals 36-1, 36-2 of 84 KV peak-to-peak. An illustrative transformer 32 with n=4 provided a potential across terminals 36-1, 36-2 of 36 KV peak-to-peak. In an illustrative embodiment, n=4. Each section 32-2-1, 32-2-2, 32-2-3, 32-2-4 includes 1000 turns of 30 AWG wire coated with an insulator. The transformer 32 with n=4 yielded an inductance in the range of about 1-35 μH, and winding capacitance of about 4 pF, compared with capacitance of about 40 pF for gap 24. The transformer 32 secondary 32-2 is wound for low intra-winding capacitance. Low intra-winding capacitance is thus achieved using a multiple section universal coil winding configuration. The relatively low intra-winding capacitance results in a relatively higher resonant frequency, in part by shifting to the gap 24 the bulk of the capacitance which sets the resonant frequency for a particular circuit 20. The universal winding technique is also believed to reduce electric field stress between winding layers below that available using uniform layered winding techniques. The insulation on the conductors of the secondary winding 32-2 is thus further protected.

The relatively higher resonant frequency of the secondary circuit 32-2, 26-1, 24, 26-2, combined with a relatively somewhat larger wire diameter for the secondary winding 32-2 permits the high voltage secondary winding 32-2 to develop relatively higher dv/dt and di/dt than the secondaries of transformers of generally similar configuration but with much smaller inductances, while still being able to deliver relatively higher secondary open circuit voltages characteristic of high inductance secondary windings. The relatively higher dv/dt and di/dt permit the electrode gap 24 capacitance to be charged to the point of breakdown in the presence of carbon or other impurities. Such impurities are known sources of parasitic resistive loss fouling, often occurring in combustion-related gaps 24. The use of relatively larger diameter conductor in the transformer primary 32-1 enhances di/dt and dv/dt effects and permits more energy to be delivered to the spark gap 24 once the arc is created.

The relatively higher resonant frequency permits the transformer 32 to be driven at a higher frequency for optimal voltage and current delivery to the spark gap 24. The discharge generated at higher frequencies is believed to be more efficient at delivering energy to an air-fuel mixture. It must be remembered that in certain utilization devices 28, the gap 24 is exposed to turbulent flow conditions across and around the electrodes 26.

The switches 38, 40, their associated drive circuitry, and the control algorithm are selected with due regard for the transformer 32. The center tapped transformer primary 32-1 is driven by only two switches 38, 40. Typically, drivers which involve a single switch require (an) energy storage element(s) and require a finite time to store the energy to be used to develop the discharge across a gap. In such systems, energy is typically stored as voltage across a capacitor or in the magnetic field of an inductor in which current is flowing. In either case, the time required to store and recover the necessary amount of energy is believed to practically prohibit operation at the resonance frequency of a transformer 32 of the type described herein. The illustrated circuit 20 configuration permits energy to be delivered directly to the secondary 32-2 of transformer 32 with less concern for energy storage and recovery times. Such a system may be driven from a µC through (an) appropriate driver(s) 62, enabling quite flexible modification of the drive signal and with it the discharge characteristic across electrodes 26 and the power delivered to the gap 24. Use of a µC also facilitates closed loop or time-based control of the power supplied to the gap 24. Such control has many advantages. The arc can assume a suitable configuration in turbulent flow adjacent the gap 24. The transformer secondary 32-2 open circuit capability, dv/dt and di/dt are determined by secondary 32-2 parameters. With sufficient secondary 32-2 capability, virtually any desired arc discharge parameters can be achieved. The discharge duration can be controlled directly with the driver control signal from the µC. When the utilization device 28 is a fuel reformer, the electrodes 26 can be so configured to permit the discharge between them to penetrate the air-fuel mixture to a depth desired to optimize performance in the presence of very lean or rich mixtures, and to control the production of smoke and other non-desirable byproducts due to the burning of rich air-fuel mixtures within the normal stratification the air-fuel spray. The electrode arrangement also enhances the arc's ability to withstand relatively turbulent air flow without being extinguished.

The ability to reduce power delivered to the gap 24 once necessary operating conditions have been reached promotes system efficiency by permitting the driving waveform duty cycle to be reduced. The ability to start at relatively higher power and then reduce the delivered power to (a) relatively lower level(s) permits the ignition of the air-fuel mixtures during, for example, cold ambient temperature starts and/or with poor fuel quality. The ability to reduce the arc power also enhances system durability by reducing electrode 26 wear.

What is claimed is:

1. A circuit for providing a potential difference across a gap between two electrodes of a utilization device, the circuit including a power source, a transformer including a primary winding and a secondary winding for coupling across the electrodes, the power source coupled to the primary winding, a first switch coupled to one of the two terminals of the primary winding, and a second switch coupled to the other of the two terminals of the primary winding, the secondary winding having a universal winding configuration and wound in sections.

2. The apparatus of claim 1 wherein each of the switches further includes a second terminal coupled to the source.

3. The apparatus of claim 1 further including a source of operating frequency signals, the switches being coupled to the source of operating frequency signals.

4. The apparatus of claim 3 wherein the source of operating frequency signals comprises a source of signals at a frequency which is between about 0.1 times a resonant frequency of a circuit including the secondary winding and about 10 times said resonant frequency.

5. The apparatus of claim 4 further including the electrodes, said circuit including the secondary winding further including the electrodes coupled across the secondary winding.

6. The apparatus of claim 3 wherein the switches comprise solid state switches, each switch including a control terminal coupled to the source of operating frequency signals.

7. The apparatus of claim 6 wherein the switches comprise insulated gate bipolar transistors or field effect transistors.

8. The apparatus of claim 1 wherein the utilization device comprises one of: a fuel reformer; an oxides of nitrogen trap; and, a soot filter regenerator.

9. The apparatus of claim 3 wherein the source of operating signals comprises a source of signals having a fundamental frequency between about 20 KHz and about 100 KHz.

10. The apparatus of claim 9 wherein the source of operating frequency signals comprises a source of operating frequency signals having a fundamental frequency between about 500 Hz and about 250 KHz modulated by a modulating signal having a frequency between about 50 Hz and 50 KHz.

11. The apparatus of claim 10 wherein the source of operating frequency signals comprises a source of operating frequency signals having a fundamental frequency between about 20 KHz and about 100 KHz modulated by a modulating signal having a frequency between about 2 KHz and about 10 KHz, the modulating signal having a variable pulsewidth defining a duty cycle.

12. The apparatus of claim 11 wherein the source of operating frequency signals comprises a source of operating frequency signals having a fundamental frequency between about 20 KHz and about 100 KHz modulated by a modulating signal having a frequency between about 2 KHz and about 10 KHz, the modulating signal having a variable pulsewidth defining a duty cycle between about 20% and about 100%.

13. The apparatus of claim 3 further including a sensor coupled to the source of operating frequency signals and adapted to sense a parameter of the utilization device.

14. The apparatus of claim 13 wherein the sensor comprises a device for providing a temperature-related output signal or a device for providing a pressure-related output signal.

15. The apparatus of claim 13 wherein the sensor comprises a timer which times elapsed time since the occurrence of an event.

16. The apparatus of claim 13 wherein the sensor comprises a device for sensing the time duration of each of multiple states of a system capable of assuming multiple states, for assigning respective weights to the sensed time durations, for accumulating the weighted, sensed time durations, and for providing an output when the accumulated, weighted, sensed time durations reach a threshold.

17. The apparatus of claim 16 wherein the sensor comprising a device for sensing the time duration of each of multiple states of a system capable of assuming multiple states comprises a device for sensing the time duration of operation of an engine in each of multiple ranges of at least one of engine load and engine torque.

18. The apparatus of claim 17 wherein the sensor comprises a device for sensing the time duration of operation of an engine in each of multiple ranges of both engine load and engine torque.

19. The apparatus of claim 13 wherein the sensor comprises a device for providing an output signal related to a concentration of a component of a fluid stream.

20. The apparatus of claim 19 wherein the sensor comprises a device for providing an output signal related to a concentration of a gas or mixture of gases in a gas stream.

21. The apparatus of claim 20 wherein the device for providing an output signal related to a concentration of a gas or mixture of gases in a gas stream comprises a device for providing an output signal related to the concentration of at least one of oxides of nitrogen, nitrogen and oxygen in a gas stream.

22. A circuit for providing a potential difference across a gap between two electrodes of a utilization device, the circuit including a power source, a transformer comprising a core, a primary winding for inducing flux in the core, a secondary winding oriented with respect to the core so that flux in the core induces voltage in the secondary winding, the secondary winding wound in sections, coupled to the electrodes, and having a universal winding configuration, the power source coupled to the primary winding, and at least one switch coupled to the primary winding to induce current flow in the primary winding.

23. The apparatus of claim 22 wherein the primary winding is wound around the core.

24. The apparatus of claim 23 further comprising a dielectric interposed between the core and the primary winding.

25. The apparatus of claim 23 wherein the secondary winding is wound around the primary winding.

26. The apparatus of claim 25 further comprising a dielectric interposed between the primary winding and the secondary winding.

27. The apparatus of claim 22 wherein the at least one switch comprises a first switch coupled to a first terminal of the primary winding and a second switch coupled to a second terminal of the primary winding.

28. The apparatus of claim 27 wherein the power source is coupled to the primary winding intermediate the first and second terminals of the primary winding.

29. The apparatus of claim 27 further including a source of operating frequency signals, the switches being coupled to the source of operating frequency signals.

30. The apparatus of claim 29 wherein the switches comprise solid state switches, each switch including a control terminal coupled to the source of operating frequency signals.

31. The apparatus of claim 30 wherein the switches comprise insulated gate bipolar transistors.

32. The apparatus of claim 30 wherein the switches comprise field effect transistors.

33. The apparatus of claim 29 wherein the source of operating frequency signals comprises a source of signals at a frequency which is between about 0.1 times a resonant frequency of a circuit including the secondary winding and about 10 times said resonant frequency.

34. The apparatus of claim 33 further including the electrodes, said circuit including the secondary winding further including the electrodes coupled across the secondary winding.

35. The apparatus of claim 34 wherein the utilization device comprises one of: a fuel reformer; an oxides of nitrogen trap; and, a soot filter regenerator.

36. The apparatus of claim 35 further including a sensor coupled to the source of operating frequency signals and adapted to sense a parameter of the utilization device.

37. The apparatus of claim 36 wherein the sensor comprises a device for providing a temperature-related output signal.

38. The apparatus of claim 36 wherein the sensor comprises a device for providing a pressure-related output signal.

39. The apparatus of claim 36 wherein the sensor comprises a timer which times elapsed time since the occurrence of an event.

40. The apparatus of claim 36 wherein the sensor comprises a device for sensing the time duration of each of multiple states of a system capable of assuming multiple states, for assigning respective weights to the sensed time durations, for accumulating the weighted, sensed time durations, and for providing an output when the accumulated, weighted, sensed time durations reach a threshold.

41. The apparatus of claim 40 wherein the sensor comprising a device for sensing the time duration of each of multiple states of a system capable of assuming multiple states comprises a device for sensing the time duration of operation of an engine in each of multiple ranges of at least one of engine load and engine torque.

42. The apparatus of claim 41 wherein the sensor comprises a device for sensing the time duration of operation of an engine in each of multiple ranges of both engine load and engine torque.

43. The apparatus of claim 36 wherein the sensor comprises a device for providing an output signal related to a concentration of a component of a fluid stream.

44. The apparatus of claim 43 wherein the sensor comprises a device for providing an output signal related to a concentration of a gas or mixture of gases in a gas stream.

45. The apparatus of claim 44 wherein the device for providing an output signal related to a concentration of a gas or mixture of gases in a gas stream comprises a device for providing an output signal related to the concentration of at least one of oxides of nitrogen, nitrogen and oxygen in a gas stream.

46. A circuit for providing a potential difference across a gap between two electrodes of a utilization device to produce an arc in the gap, the circuit including a power source, a transformer comprising a core, a primary winding for inducing flux in the core in response to power from the power source, a secondary winding oriented with respect to the core so that flux in the core induces voltage in the secondary winding, the secondary winding coupled to the electrodes, having a universal winding configurations and wound in sections connected in series.

47. The apparatus of claim 46 wherein the gap is devoid of a ceramic insulator.

* * * * *